UNITED STATES PATENT OFFICE.

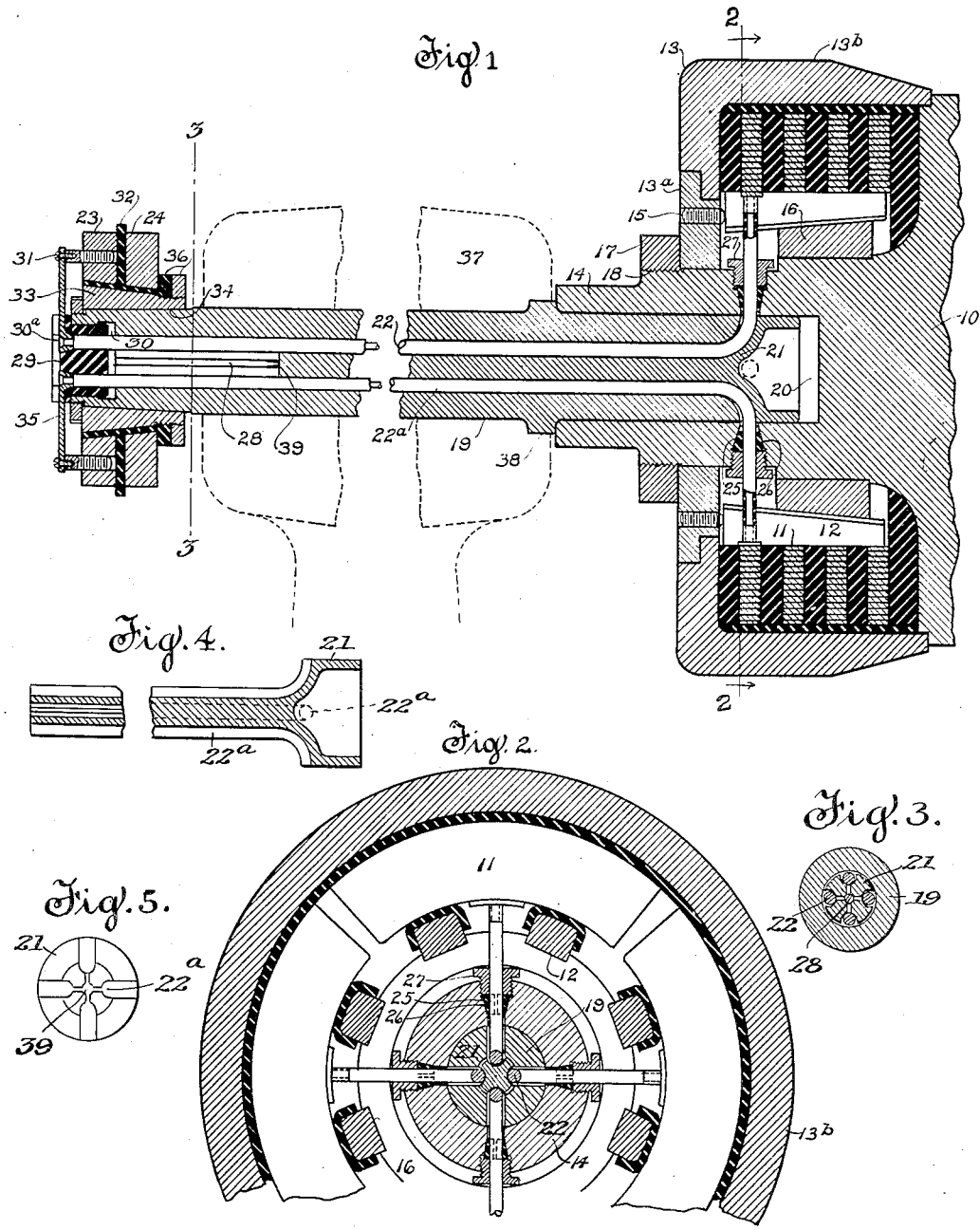

SÖREN H. MORTENSEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,122,980.      Specification of Letters Patent.      Patented Dec. 29, 1914.

Application filed September 16, 1909. Serial No. 518,102.

*To all whom it may concern:*

Be it known that I, SÖREN H. MORTENSEN, a subject of the King of Denmark, residing at Milwaukee, in the county of Milwaukee and State of Wisconsin, have invented certain new and useful Improvements in Dynamo-Electric Machines, of which the following is a full, clear, and exact specification.

My invention relates to dynamo-electric machines and more particularly to turbo-constructions.

The object of my invention is to provide novel means for supporting collector leads of machines of any size or speed without danger of the leads or connections being injured or broken by the action of centrifugal force.

My invention consists in certain novel details of construction and arrangement of parts to be described in the specification and set forth in the appended claims.

In the accompanying sheet of drawings Figure 1 is a partial sectional view of a portion of the rotor of a turbo-generator embodying my invention; Fig. 2 is a sectional view taken along the line 2—2 of Fig. 1; Fig. 3 is a detail sectional view of the shaft with the collector lead guide taken on the line 3—3 of Fig. 1; Fig. 4 is a longitudinal sectional view of the grooved collector lead guide, parts being broken away; and, Fig. 5 is an end elevation of the collector lead guide as viewed from the small end thereof.

Referring to the figures of the drawing, I have shown a core 10 which carries a winding, the end turns 11 of which are supported between insulated wedges 12 and an end cover 13. This end cover consists of two parts, the inner part 13ª which is mounted on a projecting portion 14 of the core 10, the outer portion 13ᵇ of the end cover being supported by the inner part 13ª and the core 10. Studs 15 located in the inner part 13ª of the end cover bear against the wedges 12 forcing the end turns 11 as tightly as desired toward the outer portion 13ᵇ of the end cover. The wedges are mounted on an annular member 16 which in turn is mounted on a portion of the core 10. Insulation is provided between the several end turns, between the end turns and cover 13, and between the end turns and the core. The end cover is retained in position by a nut 17 which engages a threaded portion 18 of the projection 14 of the core 10.

The shaft of the machine includes a journal 19, and a shoulder portion 38, the shaft being forced tightly into an opening 20 in the core up to said shoulder. A guide 21 for supporting collector leads 22, which connect the winding with collector rings 23 and 24, is placed within the shaft before the latter is forced into the core opening 20. The end of the guide member 21 remote from the core is provided with angularly disposed saw cuts to render this end of said member somewhat resilient and capable of being forced out of normal position. The collector leads 22 are placed in grooves 22ª between the guide and inner portion of the shaft after the latter is pressed into the opening 20 in the core. The leads are passed out through split insulating bushings 25 which occupy cone-shaped openings 26 in the core. Hollow nuts 27 through which the leads also pass press against the insulating bushings 25 forcing the latter to grip the leads as tightly as desired. In this way the leads are firmly clamped and it is impossible for them to become loosened by the action of centrifugal force. When the leads are clamped, connections with the rotor winding can conveniently be made. After the leads are pulled tight and into proper position a pin 28, preferably cone-shaped, is driven into a hole 39 in the end of the guide which is provided with saw cuts, to force the parts of this end of the guide member radially outward. This arrangement provides for clamping the leads at the outer end of the shaft. The ends of the leads, which come out through the outer end of the shaft, pass through an insulating bushing 29, which is driven into a hole 30 in the end of said shaft. The end portions of the leads are separably connected by means including the screws 30ª and 30, or in any suitable manner, to the proper collector rings.

The collector rings are insulated from each other by an insulation member 32 and are mounted on and insulated from a conical sleeve 33, which is forced and retained on an inclined portion 34 of the shaft by a nut 35, which engages a threaded portion of said shaft. The collector rings are further retained by a nut 36 which prevent their sliding. Located between the core and the collector rings is a bearing 37 in which the journal portion 19 runs. By means of this simple and compact construction it is impossible for the leads or connections to be injured or broken by the action of centrifugal force.

It is evident there may be many modifications of the precise arrangement herein shown and described and I aim in my claims to cover all such modifications which do not involve a departure from the spirit and scope of my invention.

What I claim as new is:—

1. In a dynamo-electric machine, the combination of a core, a shaft projecting into said core, a winding carried by said core, leads connected to said winding and entering said shaft through the end face thereof and extending through said shaft, supporting means for said leads within said shaft, and wedging means engaging said supporting means to cause said supporting means to grip said leads.

2. In a dynamo-electric machine, the combination of a core, a winding carried by said core, collector rings, collector leads connecting said winding and said collector rings, a journal, a movable guide within said journal for supporting said leads, a bushing, and means for clamping said bushing to coöperate with said guide to support said leads.

3. In a dynamo-electric machine, the combination of a core, a winding carried thereby, collector rings, collector leads connecting said winding and said rings, a shaft projecting into said core, a guide located within said shaft for supporting said leads, a split bushing located in said core, a member for clamping said bushing to coöperate with said guide in supporting said leads.

4. In the rotary member of a dynamo-electric machine, the combination of a core, a winding carried thereby, collector rings, collector leads connecting said winding and said collector rings, a shaft projecting into said core a short distance, a guide centrally located within said shaft for supporting said leads, a split bushing located in said core, and a member for clamping said bushing to coöperate with said guide to support said leads.

5. In a dynamo-electric machine, the combination of a hollow shaft, a core mounted thereon, a winding carried by said core, collector rings, collector leads disposed within said shaft for connecting said winding and said collector rings, means within said shaft for supporting said leads, and means engaging said supporting means to cause the supporting means to grip said leads to hold the same in position.

6. In a dynamo-electric machine, the combination of a core, a winding carried thereby, a collector ring, a collector lead connecting said winding and said ring, a shaft, a guide having a resilient end portion and being located within said shaft for supporting said lead, said guide having a groove in which said lead is located, a wedge member adapted to clamp said lead near said groove, and means associated with the resilient end portion of said guide for further fastening said lead.

In testimony whereof I affix my signature, in the presence of two witnesses.

SÖREN H. MORTENSEN.

Witnesses:
 CHAS. L. BYRON,
 ROB. E. STOLL.

---

Correction in Letters Patent No. 1,122,980.

It is hereby certified that in Letters Patent No. 1,122,980, granted December 29, 1914, upon the application of Sören H. Mortensen, of Milwaukee, Wisconsin, for an improvement in "Dynamo-Electric Machines," an error appears in the printed specification requiring correction as follows: Page 2, line 31, for the word "movable" read *removable;* and that the said Letters Patent should be read with this correction therein that the same may conform to the record of the case in the Patent Office.

Signed and sealed this 26th day of January, A. D., 1915.

[SEAL.]

R. F. WHITEHEAD,
*Acting Commissioner of Patents.*